(12) United States Patent
Shen et al.

(10) Patent No.: US 9,412,046 B2
(45) Date of Patent: Aug. 9, 2016

(54) TRAINING IMAGE ADJUSTMENT PREFERENCES

(71) Applicant: Facebook, Inc., Menlo Park, CA (US)

(72) Inventors: Shizhe Shen, San Jose, CA (US); Yael Maguire, Boston, MA (US); Damian Kowalewski, Sunnyvale, CA (US); Viktor Vladimirovich Passichenko, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/511,597

(22) Filed: Oct. 10, 2014

(65) Prior Publication Data

US 2016/0104057 A1 Apr. 14, 2016

(51) Int. Cl.
*G06K 9/62* (2006.01)
*G06K 9/66* (2006.01)

(52) U.S. Cl.
CPC ............... *G06K 9/6256* (2013.01); *G06K 9/66* (2013.01)

(58) Field of Classification Search
USPC ................. 382/156, 158, 159, 209, 218, 278; 358/537, 452
See application file for complete search history.

(56) References Cited

U.S. PATENT DOCUMENTS

| | | | | |
|---|---|---|---|---|
| 6,640,145 B2* | 10/2003 | Hoffberg | ............ | G05B 19/0426 700/17 |
| 6,850,252 B1* | 2/2005 | Hoffberg | ............ | G06K 9/00369 348/E7.061 |
| 6,990,293 B2* | 1/2006 | Hu | ..................... | H04N 1/00127 355/31 |
| 7,436,887 B2* | 10/2008 | Yeredor | ............. | G06K 9/00771 375/240.01 |
| 7,762,470 B2* | 7/2010 | Finn | ..................... | G06K 7/0004 235/380 |
| 7,940,685 B1* | 5/2011 | Breslau | ............... | H04L 43/0835 370/251 |
| 8,046,313 B2* | 10/2011 | Hoffberg | ............. | G06F 3/0482 706/14 |
| 8,160,056 B2* | 4/2012 | Van der Merwe | ...... | H04L 45/04 370/351 |
| 8,228,818 B2* | 7/2012 | Chase | ..................... | H04L 43/12 370/232 |
| 8,553,037 B2* | 10/2013 | Smith | ..................... | G06T 13/40 345/473 |
| 2010/0183053 A1 | 7/2010 | Tran et al. | | |
| 2015/0235161 A1 | 8/2015 | Azar | | |
| 2016/0104284 A1 | 4/2016 | Maguire et al. | | |

OTHER PUBLICATIONS

U.S. Appl. No. 14/311,125 of Toksvig, M., et al., filed Jun. 20, 2014.
U.S. Appl. No. 14/333,353 of Ahki, F., et al., filed Jul. 16, 2014.
(Continued)

*Primary Examiner* — Yosef Kassa
(74) *Attorney, Agent, or Firm* — Perkins Coie LLP

(57) ABSTRACT

Some embodiments include a method of operating a computing device to learn user preferences of how to process digital images. The method can include: aggregating a user image selection and a context attribute associated therewith into a preference training database for a user, wherein the user image selection represents a record of the user's preference over at least one of adjusted versions of a base image when the adjusted versions are separately processed by different visual effects; determining a visual effect preference associated based on machine learning or statistical analysis of user image selections in the preference training database, the user image selections representing experimental records corresponding to the visual effects; updating a photo preference profile with the visual effect preference; and providing the photo preference profile to an image processor to adjust subsequently captured photographs provided to the image processor.

19 Claims, 6 Drawing Sheets

(56) References Cited

OTHER PUBLICATIONS

U.S. Appl. No. 14/511,579 of Maguire, Y., et al., filed Oct. 10, 2014.
U.S. Appl. No. 14/534,675 of Yogeeswaran, K., et al., filed Nov. 6, 2014.
U.S. Appl. No. 14/534,690 of Gros, A., et al., filed Nov. 6, 2014.
U.S. Appl. No. 14/534,709 of Yogeeswaran, K., et al., filed Nov. 6, 2014.
Non-Final Office Action mailed Sep. 30, 2015, for U.S. Appl. No. 14/311,125 of Toksvig, M. et al., filed Jun. 20, 2014.
Non-Final Office Action Mailed Apr. 13, 2016 of U.S. Appl. No. 14/511,579 by Maguire, Y., et al., filed Oct. 10, 2014.

* cited by examiner

TRAINING IMAGE ADJUSTMENT PREFERENCES

TECHNICAL FIELD

At least one embodiment of this disclosure relates generally to an image processing system, and in particular to processing of photographs from camera-enabled devices.

BACKGROUND

A camera-enabled device (e.g., a digital camera or a camera-enabled phone) includes a camera module comprising a matrix of optical sensors that converts spatial optical information, e.g., luminosity and color values sensed by the optical sensors, into a matrix or an array of digital information. The camera module is an image capturing component of the camera-enabled device. The camera module may be integrated with control electronics and an output interface to other logic component(s) of the camera-enabled device. In this disclosure, camera module refers to at least the sensors and control circuitry associated therewith. The camera-enabled device refers to an apparatus that utilizes the camera module, including for example, a smart phone, a tablet, a wearable device, an e-reader or any combination thereof.

The camera-enabled device can further include an image processor that transforms the output of the camera module into a digital image. The camera module provides raw photographs taken therewith to the image processor. The image processor may process and adjust the raw photographs into digital images. The style of the resultant digital images may depend on default image processing settings and calibration parameters. However, regardless of the configuration of the default image processing settings or the calibration parameters, different operators or viewers of the digital images may never be equally satisfied with the digital images because of subjective preferences.

Figure 1:
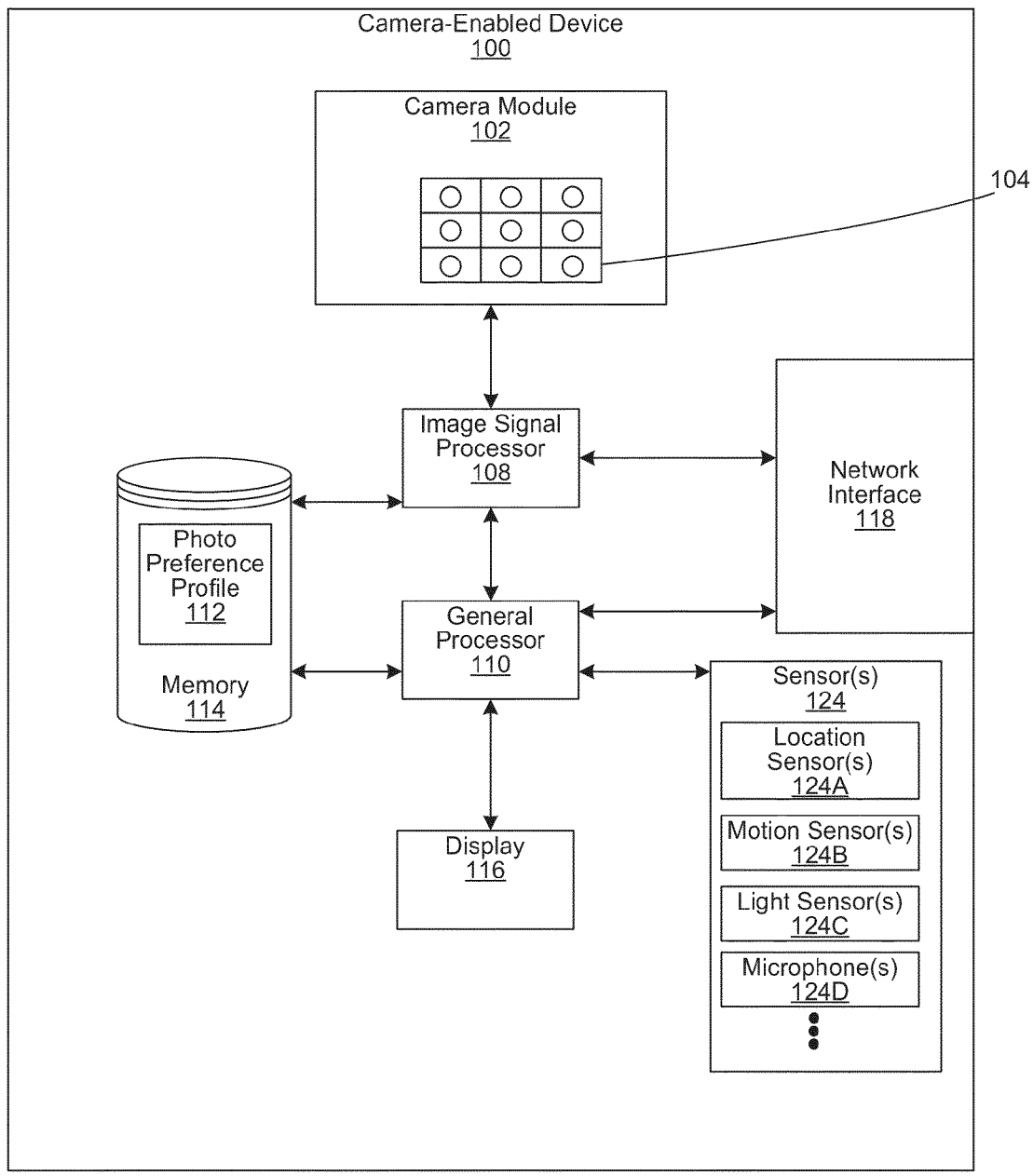
FIG. 1 is a block diagram of a camera-enabled device, in accordance with various embodiments.

The figures depict various embodiments of this disclosure for purposes of illustration only. One skilled in the art will readily recognize from the following discussion that alternative embodiments of the structures and methods illustrated herein may be employed without departing from the principles of the invention described herein.

DETAILED DESCRIPTION

In some embodiments, an image processing mechanism based on machine learning of user preferences is disclosed. While there are some objective measures on the quality of digital images, much of the pleasing effects of the digital images remain subjective to the preferences of their viewers. The disclosed image processing mechanism improves the subjective quality of images taken by a camera-enabled device. A user interface (e.g., implemented via a mobile application on the camera-enabled device or a web-based application with access to the digital images) can tune a digital image according to various parameters (e.g., color saturation, white balance, exposure, lens shading, focus location, etc.).

In some embodiments, the camera-enabled device can select at least two different image effects (e.g., filters or processes to tune a digital image), display at least two versions of the adjusted images corresponding to the image effects in a user interface (e.g., a local application running on the camera-enabled device or a web-accessible interface implemented by an external computer server), and query a user to select from among the versions of adjusted images. The camera-enabled device can send the selection to a machine learning engine (e.g., implemented on the camera-enabled device, a cloud computer server, or the same device as the user interface). The camera-enabled device can further send contextual information associated with each pre-adjusted image (e.g., raw photographs from the camera module or calibrated or pre-processed digital images) to the machine learning engine.

In some embodiments, the device implementing the user interface can send display context information (e.g., display device specification) to the machine learning engine. This may be advantageous, for example, for the machine learning engine to identify limitations of the display that may cause the user to select an adjusted image over another.

The machine learning engine can then compute one or more preference profiles that associate one or more image processing preferences with one or more contextual conditions (e.g., location, camera orientation, or lighting condition) for one or more user profiles. The preference profiles can be used to post-process captured raw photographs, calibrated images, or previously uploaded images. The preference profiles can also be used to process and tune at least some of subsequently captured raw photographs or subsequently generated digital images without having the user make the selection again. After the preference profiles are generated, the camera-enabled device or an external computer server with access to the preference profiles can identify contextual conditions associated with a digital image, and apply one or more image effects matching the contextual conditions according to the preference profiles.

Thus, various embodiments enable digital images captured using a low-end camera and shared (e.g., on an online social network) to be significantly improved as compared to the originally captured image. In various embodiments, because the sensor output adjustment parameters can be varied over time, e.g., to suit individual or population preferences, the shared images can even be superior to those generated by high-end cameras. For example, the adjustment parameters can be varied to suit color preferences of users (e.g., a particular user may prefer a slightly color neutral image as compared to a different user who prefers vivid colors), groups of users (e.g., users in Japan may prefer cooler colors as compared to users in the United States), etc. The adjustment parameters can be used to tune an image to virtually any adjustment that can be made to an image during capture or "post-processing" in addition to color, e.g., luminosity/brightness, contrast, sharpness, noise reduction, graininess, white balance, etc.

FIG. 1 is a block diagram of a camera-enabled device 100, in accordance with various embodiments. The camera-enabled device 100, for example, includes a camera module 102. The camera module 102 can include one or more optical sensors 104. In some cases, the optical sensors 104 are aligned in a matrix formation, each corresponding to at least a two-dimensional coordinate. The camera module 102 can have multiple color channels. For example, at the same location (e.g., the same two-dimensional coordinate), there may be multiple optical sensors corresponding to the multiple color channels. In another example, each of the optical sensors 104 may include subcomponents, each corresponding to a color channel.

The camera module 102 may be coupled to an image signal processor 108. The image signal processor 108 can be a general-purpose processor configured with executable instructions to process digital images. For example, the image signal processor 108 can be implemented by a general processor 110 (i.e., a general purpose computer processor). Alternatively, the image signal processor 108 may be a special-purpose circuitry adapted to process images (e.g., images captured by the camera module 102).

In some embodiments, the image signal processor 108 can process raw photographs taken by the camera module 102 based on a photo preference profile 112 before the processed images are saved into a memory 114 of the camera-enabled device 100 or presented on a display 116. In some embodiments, the image signal processor 108 can first calibrate the raw photographs into calibrated images according to a calibration parameter model (that shown). In those embodiments, the image signal processor 108 can then process the calibrated images based on the photo preference profile 112 before saving the processed images into the memory 114. For example, the photo preference profile 112 can define adjustments in color temperature, exposure, contrast, or other visual effects to the raw photographs or the calibrated images. In some embodiments, the photo preference profile 112 may also be saved in the memory 114.

In some embodiments, the photo preference profile 112 is computed externally by a computer server implementing a machine learning engine. In those embodiments, the camera-enabled device 100 can download the photo preference profile 112 via a network interface 118. The network interface 118 enables communication with external electronic devices. For example, the network interface 118 can provide wireless communication, e.g., Wi-Fi, Wi-Fi direct, Bluetooth, cellular network (e.g., EDGE, 2G, 3G, 4G, LTE, etc.). In other embodiments, the machine learning engine is implemented in the camera-enabled device 100 by the general processor 110 or the image signal processor 108.

In some embodiments, to facilitate the machine learning engine to compute the photo preference profile 112, the camera-enabled device 100 provides a threshold number of training images to an image processing interface, coupled to the machine learning engine, over time. The image processing interface can query the user to select at least one of different versions of a training image after applying different visual effects thereof. The visual effects can be visual effects of the same type with some variations (e.g., minor magnitude variations or variations having opposite characteristic). For example, the visual effects can be changing the color temperature to a blue-ish hue versus changing the color temperature to a red-ish hue or increasing exposure versus decreasing exposure.

In some embodiments, the image processing interface can also get passive inputs or implicit inputs from the user. For example, when the image processing interface can connect to a social networking system or a photo sharing system (e.g., via an application programming interface (API)). As an example, the "likes" of the user from other photographs can be used to feed into the visual effects. For example, if the image processing interface determines that a user "liked" black and white photographs frequently on the social networking system or the photo sharing system, the image processing interface can be guided to bias towards black and white images for certain scene types. This bias can be affirmed by testing the preferred visual effect with the user interface provided by the imaging processing interface. There may be a set of image processing filters for different types of scenes; e.g., landscapes or macro photographs of nature may have very different sets of filter preferences than selfies or group photo shots.

The threshold number, for example, can be indicated by the machine learning engine via a message or be a pre-determined parameter in the camera-enabled device 100, where the threshold number is deemed to be sufficient to compute/derive the photo preference profile 112. These training images can be delivered (e.g., as the images are generated or captured or in response to a user interaction) via the network interface 118 (e.g., when the image processing interface is implemented externally) or by internal interconnect(s) of the camera-enabled device 100 (e.g., when the image processing interface is implemented internally). In some embodiments, the camera-enabled device 100 can request the machine learning engine to return the photo preference profile 112 regardless of whether the threshold number of training images have been received by the image processing interface. In some embodiments, the machine learning engine can iteratively and/or continuously update the photo preference profile 112 as the image processing interface receives new training images to tune and present to the user.

Also when uploading a training image to the machine learning engine, the image signal processor 108 or the general processor 110 can provide an image-context attribute associated with the training image (e.g., the raw photograph or the calibrated image) to the machine learning engine. The image-context attribute, for example, can be a camera module configuration (e.g., exposure, focus distance, zoom, aperture size, or shutter speed), an image analysis context (e.g., statistical information of luminance and focus location estimation), a camera operation context (e.g., camera orientation, or degree of handshaking), or an environment context (e.g., ambient luminance, ambient temperature, ambient noise, time of day, or a geo-tag). In some embodiments, the image signal processor 108 or the general processor 110 can provide multiple image-context attributes associated with the training image to the machine learning engine.

At least some of these image-context attributes can be computed based on image analysis of the training images and/or sensor data captured at the time the raw photographs corresponding to the training images are taken. The image-context attributes can, for example, be based on sensor data from one or more sensors 124. The sensors 124, for example, can include one or more location sensors 124A (e.g., a global positioning system (GPS) or a cellular antenna used for triangulation), or one or more motion sensors 124B (e.g., an orientation sensor, a gyroscope, an inertia sensor, an accelerometer, or any combination thereof), one or more ambient light sensors (ALS) 124C, one or more microphones 124D, or any combination thereof.

Figure 2:
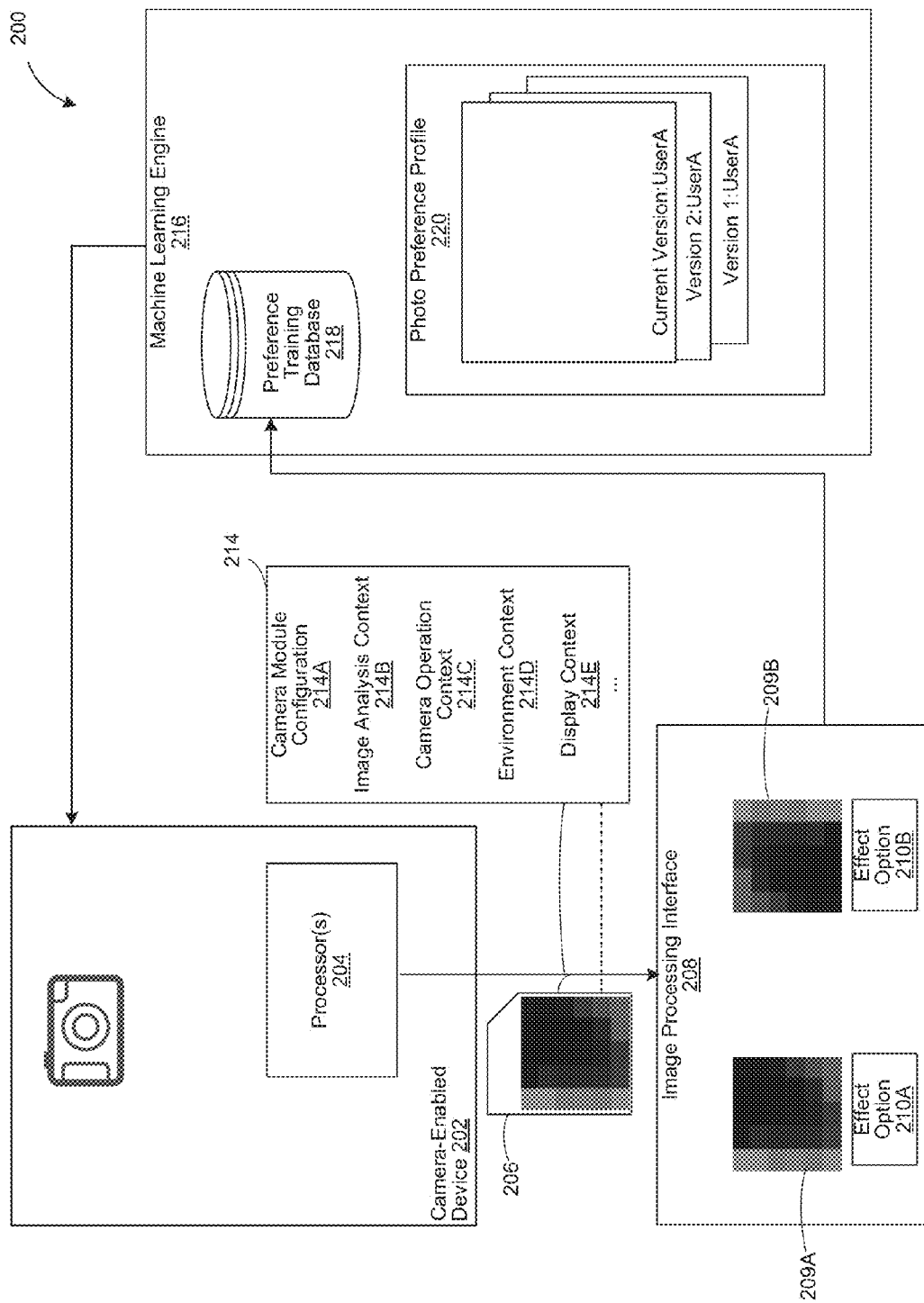
FIG. 2 is a control flow diagram of a photo preference learning system, in accordance with various embodiments.

FIG. 2 is a control flow diagram of a photo preference learning system 200, in accordance with various embodiments. The photo preference learning system 200 can include a camera-enabled device 202. For example, the camera-enabled device 202 can be the camera-enabled device 100 of FIG. 1. The camera-enabled device 202 can include one or more processors 204, e.g., the image signal processor 108 or the general processor 110 of FIG. 1.

The photo preference learning system 200 is implemented by having the one or more processors 204 share one or more training images 206 (e.g., raw photographs or calibrated images) with an image processing interface 208. The image processing interface 208 is a user interface that can present two or more adjusted image versions based on one of the training images 206 to a user.

The image processing interface 208 can generate the differently adjusted image versions (e.g., an adjusted image version 209A and an adjusted image version 209B, collectively as the "adjusted image versions 209") from a training image by applying different visual effects to the training image. In some embodiments, the image processing interface 208 can present effect options (e.g., an effect option 210A or an effect option 210B) for the user to select. In some embodiments, the image processing interface 208 can select the effect options absent any user instruction. For example, the image processing interface 208 can machine select from the effect options in a dimension of image processing that has not been explored/processed by the photo preference learning system 200 (e.g., no corresponding photo preference saved).

The user making the selection can be the operator of the camera-enabled device 202 who took the raw photographs corresponding to the training images 206. In some embodiments, the image processing interface 208 is presented to the operator of the camera-enabled device 202 in response to capturing a raw photograph. The user can also be other viewers of the training images 206. For example, the other viewers may be social connections of a user account associated with the operator in a social networking system.

Some embodiments of the disclosed system can be implemented in or coupled to a social networking system. Social networking systems commonly provide mechanisms enabling users to interact with objects, including for example photographs, and other users both within and external to the context of the social networking system. The social networking system may utilize a web-based interface or a mobile interface comprising a series of inter-connected pages displaying and enabling users to interact with social networking system objects and information.

In some embodiments, the image processing interface 208 can be implemented in the camera-enabled device 202. That is, the image processing interface 208 can be a local application running on an operating system of the camera-enabled device 202 presenting via, for example, the display 116 and computing via, for example, the image signal processor 108 or the general processor 110 of FIG. 1. In some embodiments, the image processing interface 208 is implemented in a computer server external to the camera-enabled device 202. That is, the image processing interface 208 can be a computer server system implementing a website, application programming interface (API), or both. For example, a user of the camera-enabled device 202 can access the image processing interface 208 via a network connection (e.g., using the network interface 118 of FIG. 1).

In some embodiments, when the one or more processors 204 share the training images 206 with the image processing interface 208, the one or more processors 204 can also share context attributes 214 associated with the training images 206. In some embodiments, the image processing interface 208 can request input of at least one of the context attributes 214 from the user. In some embodiments, at least a portion of the context attributes 214 is determined by the one or more processors 204.

The context attributes 214, for example, can include a camera module configuration 214A, an image analysis context 214B, a camera operation context 214C, and/or an environment context 214D. The camera module configuration 214A indicates one or more parameters used to configure the camera module of the camera-enabled device 202 when the training image is taken. For example, the camera module configuration 214A can indicate zoom, exposure, or focus distance of the camera module. The image analysis context 214B indicates one or more attributes of the training image determined through image analysis by the one or more processors 204 of the camera-enabled device 202. In some embodiments, the image analysis context 214B is absent from the shared context attributes because such context information can be re-derived at a later time by analyzing the training image.

The camera operation context 214C indicates one or more camera operational behaviors of an operating user as observed by sensors (e.g., an accelerometer, a gyroscope, other inertial sensor or motion sensor, microphone, touchscreen, or any combination thereof) in the camera-enabled device 202. For example, the camera operation context 214C can be used to detect a camera angle relative to the Earth or other background surfaces. The environment context 214D indicates information regarding the ambient environment that the camera-enabled device 202 is in when the training image is taken. For example, this can be a location information, background condition, lighting condition, a solar exposure condition, a time-of-day or day of year information, a shading information, or any combination thereof. This information can be derived from a geo-tag (from a global positioning system (GPS) of the camera-enabled device 202 or via cellular triangulation), ambient temperature, ambient noise, weather database, map database, a timestamp tracked by the camera-enabled device 202, or any combination thereof. In some cases, the environment context 214D can include the location and/or timing information such that another system can reference the location and/or time to derive other information from external databases (e.g., public weather database, sun path database, map database, etc.). In other cases, the environment context 214D can include the location and time information and other environmental information that the camera-enabled device 202 has downloaded from the external databases. The environment context 214D can include other sensor information. For example, to determine the lighting condition, an ambient light sensor can be used. The ambient light condition can subsequently facilitate the machine learning engine to make the correct judgment on a user preference to specific visual effects.

In some embodiments, the image processing interface 208 can add a display context 214E to the context attributes 214 that are associated with the user image selection (e.g., represented by the selected adjusted image version, the selected effect option, the rejected adjusted image version, the rejected effect option, or any combination thereof). The display context 214E, for example, can provide context information about the display capabilities of an output hardware used by the image processing interface 208. The display context 214E may advantageously provide useful information in either determining a user's photo preference when using a particular display or in normalizing out effects of the particular display to a user's preference over a particular visual effect/filter.

After a user selects at least one of the adjusted image versions 209, the image processing interface 208 can provide the user image selection to a machine learning engine 216. The image processing interface 208 can also forward the context attributes 214 to the machine learning engine 216. In some embodiments, the camera-enabled device 202 forwards the context attributes 214 directly to the machine learning engine 216. The image processing interface 208 can also identify (e.g., via a user account identifier) the user who made the user image selection.

In some embodiments, the machine learning engine 216 and the image processing interface 208 can both be implemented in the camera-enabled device 202 (e.g., via the one or more processors 204). In some embodiments, the machine learning engine 216 and the image processing interface 208 are implemented on a computing machine external to the camera-enabled device 202. In some embodiments, the machine learning engine 216, the image processing interface 208, and the camera-enabled device 202 are all separate computing machines. In some embodiments, the image processing interface 208 is implemented in the camera-enabled device 202 while the machine learning engine 216 is implemented in a computing machine external to the camera-enabled device 202. The computing machine(s) external to the camera-enabled device 202 can be implemented with one or more computing devices. The computing machine(s), for example, can be a personal computer, a computer server, a cloud computing device, a virtualized operating system, a distributed computing cluster, a mobile device, a field programmable gate array (FPGA), an application-specific integrated circuitry (ASIC), or any combination thereof.

In some embodiments, the machine learning engine 216 can aggregate the user image selection and the associated context attributes in a preference training database 218. The machine learning engine 216 can collect the user image selection and the associated context attributes until there is a statistically significant amount of these preference pairs (i.e., pairs of user image selection and associated context attributes) to produce a photo preference profile that consistently and/or accurately reflects a user's preference. The preference training database 218 may be implemented by one or more volatile and/or non-volatile memory devices controlled by a database manager.

When there is sufficient number of the preference pairs in the preference training database 218 (e.g., the machine learning engine 216 can check periodically to see if a threshold is met or test for sufficiency based on a criterion), the machine learning engine 216 can compute a photo preference profile 220 based on a set of the preference pairs. The photo preference profile 220 can be iteratively updated in response to the machine learning engine 216 receiving one or more new preference pairs. The machine learning engine 216 can track multiple versions of the photo preference profile 220 from each iteration. The machine learning engine 216 can maintain a different photo preference profile 220 for each user who interacted with the image processing interface 208 to produce the preference pair. The set of preference pairs may be selected based on contextual similarities. The machine learning engine 216 can identify contextual similarities between the preference pairs by accessing the context attributes 214 stored in the preference training database 218.

The machine learning engine 216 can compute the photo preference profile 220 by performing machine learning and/or statistical analysis, e.g., a dimension reduction analysis. For example, the machine learning may be based on a Gaussian mixture model or a support vector machine (SVM). For example, the dimension reduction analysis can be principal component analysis (PCA), regression analysis, partial least squares analysis, exploratory factor analysis, independent component analysis (ICA), canonical correlation analysis (CCA), multivariate regression, Fisher's Linear Discriminant (FLD), linear discriminative analysis (LDA), non-negative matrix factorization (NMF), kernel methods for nonlinear extension, or any combination thereof. The machine learning and/or the statistical analysis enable the machine learning engine 216 to identify one or more features that caused a user to prefer a digital image over another that is unrelated to context or particular to one or more contextual conditions. These features can correspond to subjective preferences to specific visual effects.

In some embodiments, the machine learning engine 216 can perform the machine learning/statistical analysis on contextually similar training images to compute a preference for color temperature, exposure level, contrast level, or other visual effects. This process generates context-specific processing rules to store in the photo preference profile 220. In some embodiments, the machine learning engine 216 can also determine context independent photo preferences for a user to store in the photo preference profile 220. While this disclosure uses images as an example, in some embodiments, the same concept described for the user preference training of digital images can be applied to other media objects, for example, videos and audio clips.

Once the machine learning engine 216 finishes performing the machine learning/statistical analysis, the machine learning engine 216 can save each preference (e.g., context-specific or context independent processing rules) as part of the photo preference profile 220 associated with a user. In some embodiments, the photo preference profile 220 can be used by the machine learning engine 216 to post-process photographs taken by the camera-enabled device 202. In some embodiments, the machine learning engine 216 can send the photo preference profile 220 to the camera-enabled device 202, such that the one or more processors 204 can post-processes existing raw photographs or calibrated images or subsequently captured photographs to align with the photo preference profile 220. In some embodiments, the machine learning engine 216 can send the photo preference profile 220 to an external server (e.g., a social networking system) that has access to photographs that may be viewed by the user associated with the photo preference profile 220. The external server can then post-process existing and/or subsequently uploaded photographs according to the photo preference profile 220 for the user's enjoyment.

Some embodiments, the machine learning engine 216 can generate a regional, group-based, demographic-based photo preference profile. The machine learning engine 216 can compute these photo preference profiles by averaging the photo preference profiles of individual users who are associated with a region, a group, a demographic attribute, and/or interests. For users who do not opt for the individualized preference learning process, their photographs can still be processed to align with the photo preference profile of an affiliated region, group or demographic.

Figure 3:
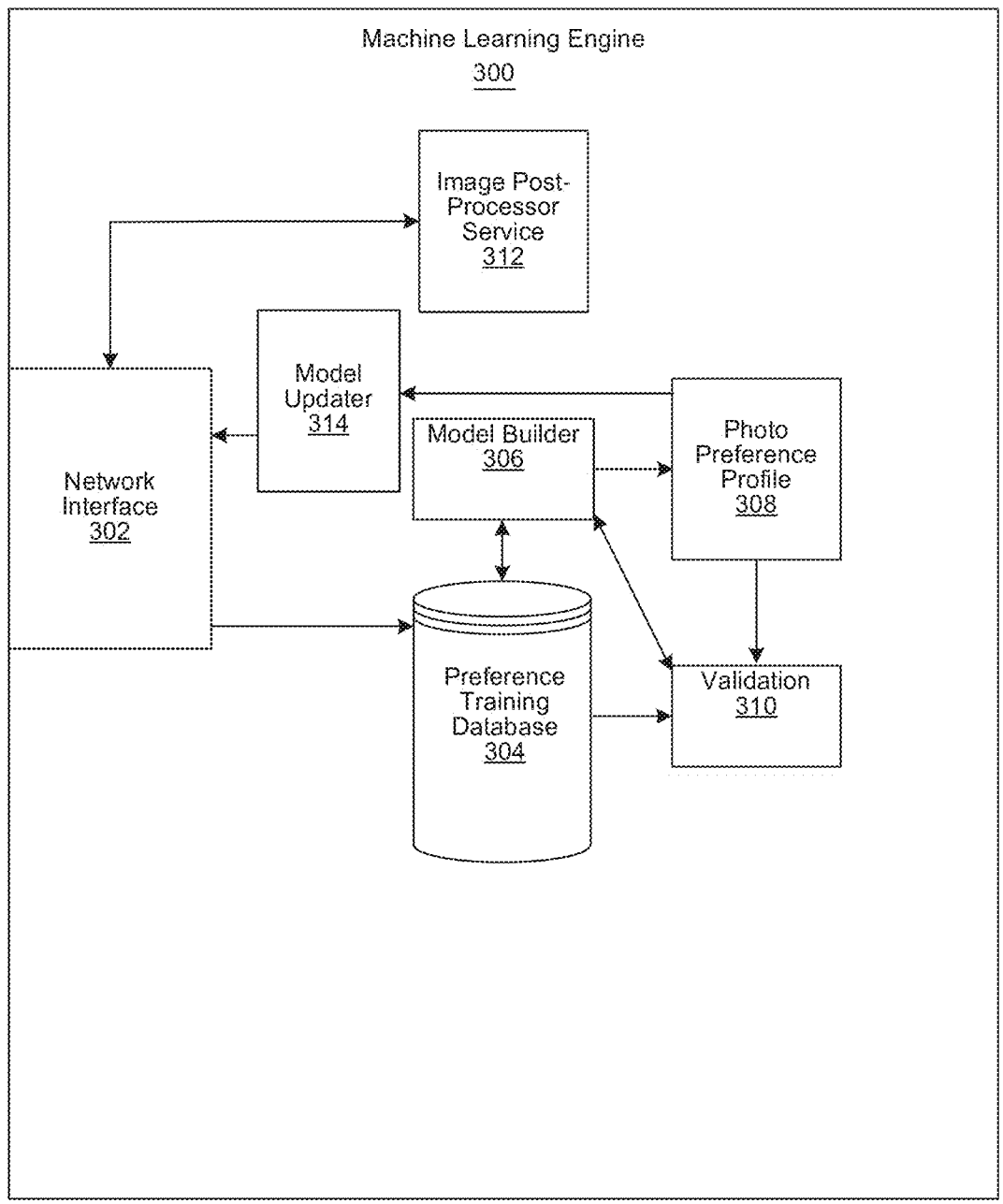
FIG. 3 is a functional block diagram of a machine learning engine, in accordance with various embodiments.

FIG. 3 is a functional block diagram of a machine learning engine 300, in accordance with various embodiments. In some embodiments, the machine learning engine 300 includes a network interface 302 that can send and/or receive messages from one or more mobile devices, e.g., the camera-enabled device 100 of FIG. 1 or the camera-enabled device 202 of FIG. 2. In other embodiments, the machine learning engine 300 is implemented within one or more mobile devices, e.g., the camera-enabled device 100 or the camera-enabled device 202. The machine learning engine 300 can maintain a preference training database 304 (e.g., the preference training database 218 of FIG. 2). The machine learning engine 300 can receive preference pairs overtime from a camera-enabled device (e.g., the camera-enabled device 100 of FIG. 1) via the network interface 302 to be stored in the preference training database 304.

The machine learning engine 300 can include a model builder module 306 that generates a photo preference profile 308. The model builder module 306 can generate the photo preference profile 308 based on at least a subset of the preference pairs in the preference training database 304. The model builder module 306 can select the subset based on contextual similarities of the preference pairs. The model builder module 306 can perform statistical analysis or machine learning to identify visual effects that may have caused the user to consistently select particular adjusted image versions in the subset of preference pairs. The identified visual effects can then be saved into the photo preference profile 308 to process future photos or existing saved photos.

In some embodiments, the preference pairs of a first user may include related preference pairs of other users. The related preference pairs can be generated from presenting adjusted images based on photographs taken by one or more camera modules other than the camera module that the photo preference profile 308 is associated with. For example, the related preference pairs may be generated from presenting related adjusted image versions based on photographs taken by the other camera modules under one or more similar contextual conditions as the preference pairs of the first user. When taking such related preference pairs of other users into account, the model builder module 306 can filter the additional users based on geographical location, a group affiliation, or a demographic attribute. In some embodiments, the model builder module 306 can determine the geographical location, the group affiliation, or the demographic attribute based on a user profile or a social graph (i.e., a network of interconnected user profiles) in a social networking system.

Optionally, the machine learning engine 300 can include a validation module 310 that processes at least a portion of the preference pairs according to a current version of the photo preference profile 308 to determine whether consistent preferences are observed. Statistical analysis can be used to determine whether the photo preference profile 308 is consistently matching the user's preferences. The portion of preference pairs used for validation can overlap with or be separate from preference pairs used to build the photo preference profile 308.

In some embodiments, the machine learning engine 300 can include an image post-processor service module 312. The image post-processor service module 312 provides a web accessible service via the network interface 302. The web accessible service can be part of a social networking system. The web accessible service (e.g., as an application programming interface (API) or a website) allows a camera-enabled device to upload photographs to the machine learning engine 300. In turn, the machine learning engine 300 can adjust the photographs according to an owner's photo preference profile or a viewer's photo preference profile. If the machine learning engine 300 contains a photo preference profile associated with that camera-enabled device, then the image post-processor service module 312 can adjust existing, stored photographs and/or subsequently uploaded photographs utilizing the associated photo preference profile.

In some embodiments, the machine learning engine 300 can include a model updater module 314. The model updater module 314 can provide the photo preference profile to its associated camera-enabled device. This mechanism enables the camera-enabled device to adjust at least a subset or all of photographs taken using its camera module according to its owners preference. Unlike using the image post-processor service module 312, the camera-enabled device can use the photo preference profile even without a network connection.

Portions of active components, modules, and databases (e.g., hardware-based, firmware-based, software-based, or other configurable and functional modules) associated with the machine learning engine 300 and/or the photo preference learning system 200 may be implemented in the form of special-purpose circuitry, in the form of one or more appropriately programmed programmable processors, a single board chip, a field programmable gate array, a network capable computing device, a virtual machine, a cloud-based terminal, or any combination thereof. For example, the components described can be implemented as instructions on a tangible storage memory capable of being executed by a processor or other integrated circuit chip. The tangible storage memory may be volatile or non-volatile memory. In some embodiments, the volatile memory may be considered "non-transitory" in the sense that it is not transitory signal. Memory space and storages described in the figures can be implemented with the tangible storage memory as well, including volatile or non-volatile memory.

Each of the components may operate individually and independently of other components. Some or all of the components may be executed on the same host device or on separate devices. The separate devices can be coupled through one or more communication channels (e.g., wireless or wired channel) to coordinate their operations. Some or all of the components may be combined as one component. A single component may be divided into sub-components, each sub-component performing separate method step or method steps of the single component.

In some embodiments, at least some of the components share access to a memory space. For example, one component may access data accessed by or transformed by another component. The components may be considered "coupled" to one another if they share a physical connection or a virtual connection, directly or indirectly, allowing data accessed or modified from one component to be accessed in another component. In some embodiments, at least some of the components can be upgraded or modified remotely (e.g., by reconfiguring executable instructions that implements a portion of the components). The photo preference learning system 200 may include additional, fewer, or different components for various applications.

Figure 4:
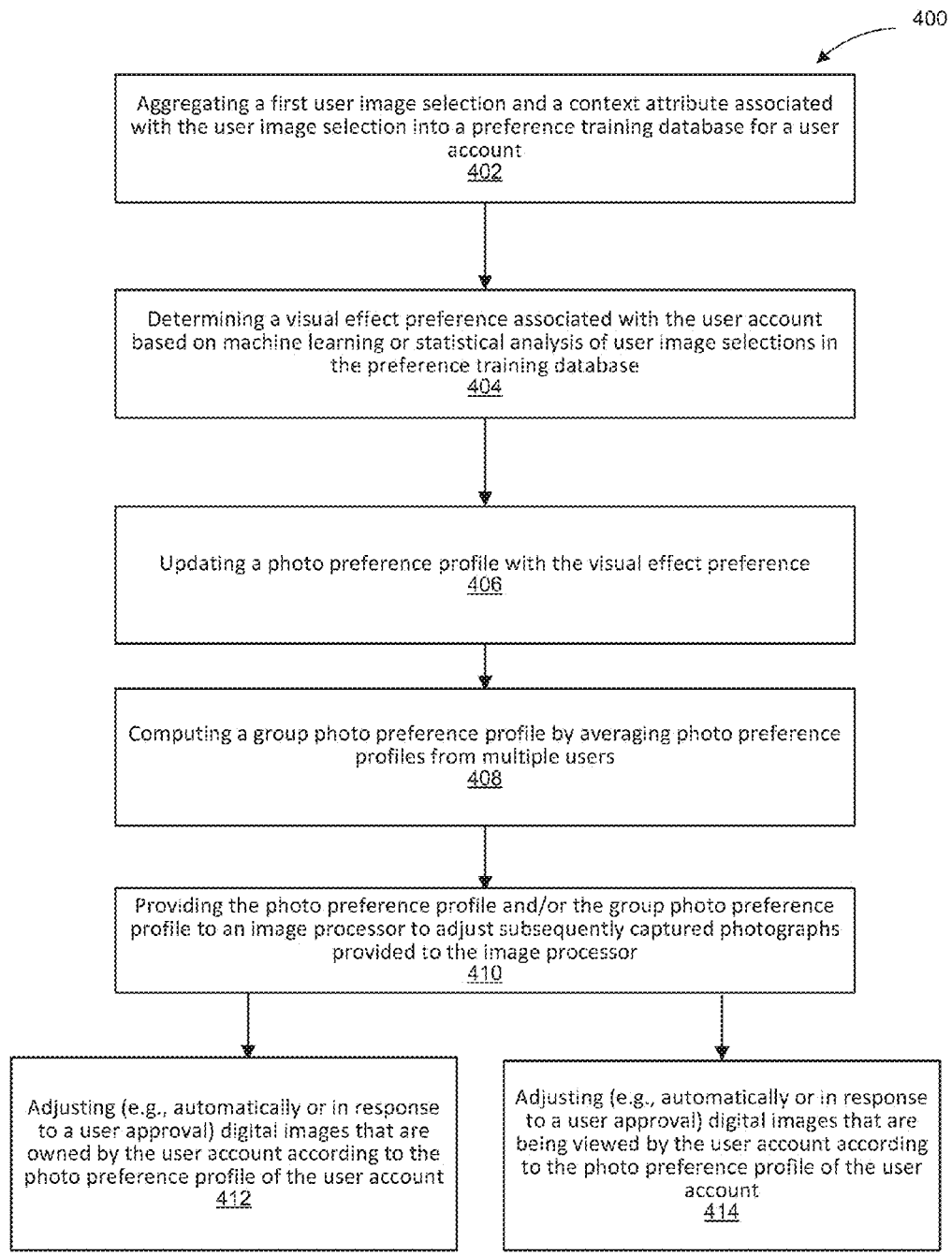
FIG. 4 is a flow chart of a method of operating a computing device to learn user preferences to tune digital images, in accordance with various embodiments.

FIG. 4 is a flow chart of a method 400 of operating a computing device (e.g., the machine learning engine 300 of FIG. 3) to learn user preferences to tune digital images, in accordance with various embodiments. At step 402, the computing device aggregates a first user image selection and a context attribute associated with the user image selection into a preference training database for a user account. The first user image selection represents an experimental record of a preferred selection by the user account over at least one of adjusted versions of a base image, when the adjusted versions are separately processed by test visual effects that are different. The test visual effects can be image filters or image processing techniques of the same type, but with different adjustment magnitudes or polarities.

Either a camera-enabled device (e.g., the camera-enabled device 100 of FIG. 1) that generated the base image or an image processing interface (e.g., the image processing interface 208 of FIG. 2) can provide the context attribute. The camera-enabled device can be associated with the user account. In some embodiments, the image processing interface can provide the first user image selection. The image processing interface can be implemented by the camera-enabled device, the computing device, or another computing device.

In some embodiments, the computing device is a computer server connected via a network connection to the camera-enabled device. The camera-enabled device can be the device that generated the base image. In some embodiments, the computing device is the camera-enabled device.

At step 404, the computing device can determine a visual effect preference associated with the user account based on machine learning or statistical analysis of user image selections in the preference training database. The user image selections can represent experimental records corresponding to the same test visual effects in different experimental iterations from when the first user image selection was captured. The visual effect preference can be an image processing rule that is particular to the context attribute. For example, the image processing rule can specify a visual effect process to execute when a digital image is determined to be associated with the context attribute.

Determining the visual effect preference can include performing the machine learning or statistical analysis on the user image selections associated with the same context attribute. For example, the context attribute can be a camera module configuration, an image analysis context, a camera operation context, an environment context, or any combination thereof. For another example, the context attribute can be a display device context associated with a display used to present the adjusted versions At step 406, the computing device can update a photo preference profile with the visual effect preference. Optionally at step 408, the computing device can compute a group photo preference profile by averaging photo preference profiles from multiple users. The photo preference profiles can include at least the photo preference profile of the user account.

Then at step 410, the computing device can provide the photo preference profile and/or the group photo preference profile to an image processor to adjust subsequently captured photographs provided to the image processor. In some embodiments, the image processor can use the photo preference profile to adjust existing images in a memory device that is accessible to the image processor. In some embodiments, the image processor is part of the camera-enabled device. In some embodiments, the image processor is part of the computing device.

At step 412, the image processor can adjust (e.g., automatically or in response to a user approval) digital images that are owned by the user account according to the photo preference profile of the user account. Alternatively or in addition to step 412, at step 414, the image processor can adjust (e.g., automatically or in response to a user approval) digital images that are being viewed by the user account according to the photo preference profile of the user account.

Figure 5:
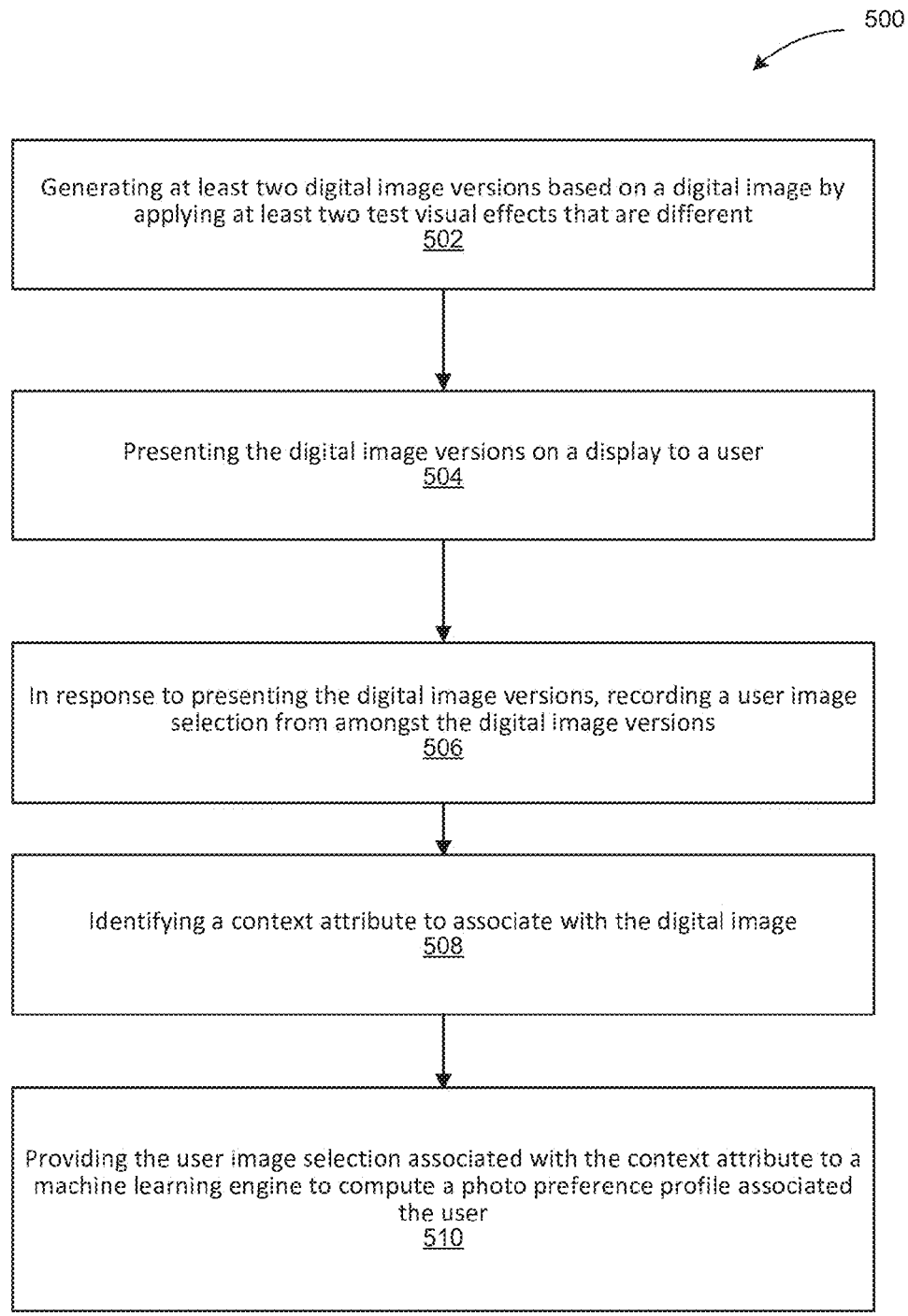
FIG. 5 is a flow chart of a method of operating an image processing interface to learn user preferences to tune digital images, in accordance with various embodiments.

FIG. 5 is a flow chart of a method 500 of operating an image processing interface (e.g., the image processing interface 208 of FIG. 2) to learn user preferences to tune digital images, in accordance with various embodiments. The image processing interface may be implemented by a camera-enabled device (e.g., the camera-enabled device 100 of FIG. 1) or a computing machine (e.g., the computing device 600 of FIG. 6) with network connection to the camera-enabled device. The method 500 can include step 502 of the image processing interface generating at least two digital image versions based on a digital image by applying at least two test visual effects that are different. The digital image can be provided by the camera-enabled device. In some embodiments, generating the at least two digital image versions is in response to capturing a photograph via a camera module of the camera-enabled device.

At step 504, the image processing interface can then present the digital image versions on a display (e.g., the display 116 of FIG. 1) to a user. For example, the image processing interface can cause a display device to display the digital image versions. The display device can be part of the image processing interface or coupled to the image processing interface via an interconnect, a network connection, or a combination thereof. In response to presenting the digital image versions, at step 506, the image processing interface can record a user image selection from amongst the digital image versions. At step 508, the image processing interface can identify a context attribute to associate with the digital image. For example, the context attribute can be provided by the camera-enabled device.

At step 510, the image processing interface can provide the user image selection associated with the context attribute to a machine learning engine to compute a photo preference profile associated the user. The machine learning engine can be configured to compute the photo preference profile by comparing multiple user image selections from multiple comparisons of adjusted image versions generated using the test visual effects. Optionally, step 510 can include the image processing interface identifying a display device specification of the display used to present the digital image versions and providing the display device specification to the machine learning engine as another context attribute.

In some embodiments, the machine learning engine provides the photo preference profile to the camera-enabled device. For example, the camera-enabled device can then configure an image signal processor thereon to apply (e.g., automatically or in response to a user approval) a visual effect to digital images subsequently provided to the image signal processor according to the photo preference profile. For another example, the camera-enabled device can then configured the image signal processor to apply (e.g., automatically or in response to a user approval) a visual effect to existing digital images saved in a memory accessible by the image signal processor according to the photo preference profile.

While processes or methods are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. In addition, while processes or blocks are at times shown as being performed in series, these processes or blocks may instead be performed in parallel, or may be performed at different times.

Figure 6:
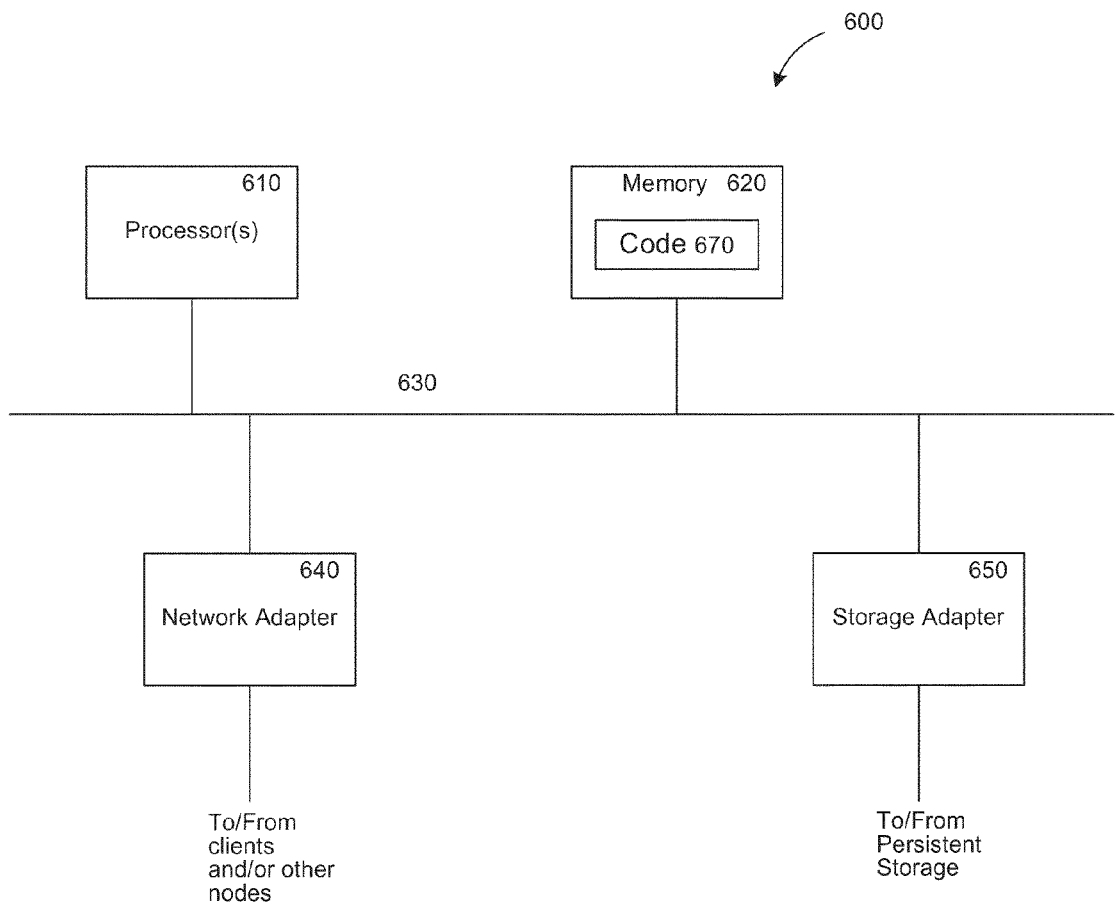
FIG. 6 is a block diagram of an example of a computing device, which may represent one or more computing device or server described herein, in accordance with various embodiments.

FIG. 6 is a block diagram of an example of a computing device 600, which may represent one or more computing device or server described herein, in accordance with various embodiments. The computing device 600 can be one or more computing devices that implement the image processing interface 208 of FIG. 2, the machine learning engine 216 of FIG. 2, the machine learning engine 300 of FIG. 3 or methods and processes described in this disclosure (e.g., the method 400 of FIG. 4 and/or the method 500 of FIG. 5). The computing device 600 includes one or more processors 610 and memory 620 coupled to an interconnect 630. The interconnect 630 shown in FIG. 6 is an abstraction that represents any one or more separate physical buses, point-to-point connections, or both connected by appropriate bridges, adapters, or controllers. The interconnect 630, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or a "Firewire".

The processor(s) 610 is/are the central processing unit (CPU) of the computing device 600 and thus controls the overall operation of the computing device 600. In certain embodiments, the processor(s) 610 accomplishes this by executing software or firmware stored in memory 620. The processor(s) 610 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 620 is or includes the main memory of the computing device 600. The memory 620 represents any form of random access memory (RAM), read-only memory (ROM), flash memory, or the like, or a combination of such devices. In use, the memory 620 may contain a code 670 containing instructions according to the mesh connection system disclosed herein.

Also connected to the processor(s) 610 through the interconnect 630 are a network adapter 640 and a storage adapter 650. The network adapter 640 provides the computing device 600 with the ability to communicate with remote devices, over a network and may be, for example, an Ethernet adapter or Fibre Channel adapter. The network adapter 640 may also provide the computing device 600 with the ability to communicate with other computers. The storage adapter 650 enables the computing device 600 to access a persistent storage, and may be, for example, a Fibre Channel adapter or SCSI adapter.

The code 670 stored in memory 620 may be implemented as software and/or firmware to program the processor(s) 610 to carry out actions described above. In certain embodiments, such software or firmware may be initially provided to the computing device 600 by downloading it from a remote system through the computing device 600 (e.g., via network adapter 640).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic," as used herein, can include, for example, programmable circuitry programmed with specific software and/or firmware, special-purpose hardwired circuitry, or a combination thereof.

Some embodiments of the disclosure have other aspects, elements, features, and steps in addition to or in place of what is described above. These potential additions and replacements are described throughout the rest of the specification.

What is claimed is:

1. A computer-implemented method comprising:
aggregating, by a computing device, a first user image selection and a context attribute associated with the first user image selection into a preference training database for a user, wherein the first user image selection represents a record of how the user has preferred over at least one of adjusted versions of a base image when the adjusted versions are separately processed by visual effects that are different;
determining, by the computing device, a visual effect preference associated with the user based on machine learning or statistical analysis of user image selections in the preference training database, wherein the user image selections represent experimental records corresponding to the visual effects, wherein the visual effect preference is an image processing rule that is particular to the context attribute, and wherein the image processing rule specifies a visual effect process to execute when a digital image is determined to be associated with the context attribute;
updating, by the computing device, a photo preference profile with the visual effect preference; and
providing, by the computing device, the photo preference profile to an image processor to adjust subsequently captured photographs provided to the image processor.

2. The computer-implemented method of claim 1, wherein the computing device is a computer server connected via a network connection to a camera-enabled device associated with the user, the camera-enabled device having generated the base image.

3. The computer-implemented method of claim 2, wherein the image processor is part of the camera-enabled device.

4. The computer-implemented method of claim 1, wherein the computing device is a camera-enabled device associated with the user, the camera-enabled device having captured the base image.

5. The computer-implemented method of claim 1, wherein determining the visual effect preference includes performing the machine learning or statistical analysis on the user image selections associated with the context attribute.

6. The computer-implemented method of claim 1, wherein the context attribute is a camera module configuration, an image analysis context, a camera operation context, an environment context, or any combination thereof.

7. The computer-implemented method of claim 1, wherein the context attribute is a display device context associated with a display used to present the adjusted versions.

8. The computer-implemented method of claim 1, wherein the visual effects are image filters of the same type.

9. The computer-implemented method of claim 1, further comprising the image processor adjusting digital images that are owned by the user according to the photo preference profile of the user.

10. The computer-implemented method of claim 1, further comprising the image processor adjusting digital images that are being viewed by the user according to the photo preference profile of the user.

11. The computer-implemented method of claim 1, wherein providing the photo preference profile to the image processor is to adjust existing images in a memory device that is accessible to the image processor.

12. The computer-implemented method of claim 1, further comprising computing a group photo preference profile by averaging photo preference profiles from a group of multiple users, the photo preference profiles including the photo preference profile of the user.

13. A computer-readable storage memory storing computer-executable instructions comprising:
   instructions for generating at least two digital image versions based on a digital image by applying at least two visual effects that are different;
   instructions for causing the digital image versions to be displayed at a display device;
   instructions for recording a user image selection from amongst the digital image versions, in response to displaying the digital image versions;
   instructions for identifying a context attribute to associate with the digital image; and
   instructions for providing the user image selection associated with the context attribute to a machine learning engine to update a photo preference profile associated a user, wherein updating the photo preference profile includes determining an image processing rule particular to the context attribute, and wherein the image processing rule specifies a visual effect process to execute when a digital image is determined to be associated with the context attribute.

14. The computer-readable storage memory of claim 13, wherein generating the at least two digital image versions is in response to capturing a photograph via a camera module.

15. The computer-readable storage memory of claim 13, further comprising:
   instructions for identifying a display device specification of the display device used to present the digital image versions; and
   instructions for providing the display device specification to the machine learning engine.

16. The computer-readable storage memory of claim 13, further comprising:
   instructions for receiving the photo preference profile from the machine learning engine; and
   instructions for configuring an image signal processor to apply a visual effect to digital images subsequently provided to the image signal processor according to the photo preference profile.

17. The computer-readable storage memory of claim 13, further comprising:
   instructions for receiving the photo preference profile from the machine learning engine; and
   instructions for configuring an image signal processor to apply a visual effect to existing digital images saved in a memory accessible by the image signal processor according to the photo preference profile.

18. The computer-readable storage memory of claim 13, further comprising:
   instructions for implementing the machine learning engine to compute the photo preference profile by comparing multiple user image selections from multiple comparisons of adjusted image versions generated using the visual effects.

19. A computing device comprising:
   a component for generating at least two digital image versions based on a digital image by applying at least two visual effects that are different;
   a component for causing the digital image versions to be displayed at a display device;
   a component for recording a first user image selection from amongst the digital image versions, in response to displaying the digital image versions;
   a component for identifying a context attribute to associate with the digital image; and
   a component for updating a photo preference profile associated with a user by applying machine learning or statistical analysis on multiple user image selections associated with the context attribute, the multiple user image selections including the first user image selection;
   wherein updating the photo preference profile includes determining an image processing rule particular to the context attribute, and wherein the image processing rule specifies a visual effect process to execute when a digital image is determined to be associated with the context attribute.

* * * * *